United States Patent
Bamford et al.

(10) Patent No.: US 7,139,772 B2
(45) Date of Patent: Nov. 21, 2006

(54) OWNERSHIP REASSIGNMENT IN A SHARED-NOTHING DATABASE SYSTEM

(75) Inventors: Roger J. Bamford, Woodside, CA (US); Sashikanth Chandrasekaran, Belmont, CA (US); Angelo Pruscino, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 488 days.

(21) Appl. No.: 10/665,062

(22) Filed: Sep. 17, 2003

(65) Prior Publication Data

US 2004/0117345 A1 Jun. 17, 2004

Related U.S. Application Data

(60) Provisional application No. 60/492,019, filed on Aug. 1, 2003.

(51) Int. Cl.
*G06F 17/30* (2006.01)
(52) U.S. Cl. ..................................................... 707/102
(58) Field of Classification Search .............. 707/1–10, 707/100–104.1, 200–206
See application file for complete search history.

(56) References Cited

U.S. PATENT DOCUMENTS

| | | | |
|---|---|---|---|
| 4,827,411 A | 5/1989 | Arrowood et al. | |
| 4,873,517 A | 10/1989 | Baratz et al. | |
| 4,914,571 A | 4/1990 | Baratz et al. | |
| 4,972,437 A | 11/1990 | Citron et al. | |
| 5,101,348 A | 3/1992 | Arrowood et al. | |
| 5,109,483 A | 4/1992 | Baratz et al. | |
| 5,313,051 A | 5/1994 | Brigida et al. | |
| 5,319,773 A | 6/1994 | Britton et al. | |
| 5,432,926 A | 7/1995 | Citron et al. | |
| 5,539,883 A | 7/1996 | Allon et al. | |
| 5,613,060 A | 3/1997 | Britton et al. | |

(Continued)

FOREIGN PATENT DOCUMENTS

CA 2 435 388 A1 1/2003

(Continued)

OTHER PUBLICATIONS

Abdallah, Maha et al., "One-Phase Commit: Does It Make Sense?" IEEE (1998), pp. 182-192.

(Continued)

*Primary Examiner*—Diane D. Mizrahi
(74) *Attorney, Agent, or Firm*—Hickman Palermo Truong & Becker LLP; Christopher J. Brokaw

(57) ABSTRACT

Various techniques are described for improving the performance of a shared-nothing database system in which at least two of the nodes that are running the shared-nothing database system have shared access to a disk. Specifically, techniques are provided for changing the ownership of data in a shared-nothing database without changing the location of the data on persistent storage. Because the persistent storage location for the data is not changed during a transfer of ownership of the data, ownership can be transferred more freely and with less of a performance penalty than would otherwise be incurred by a physical relocation of the data. Various techniques are also described for providing fast run-time reassignment of ownership. Because the reassignment can be performed during run-time, the shared-nothing system does not have to be taken offline to perform the reassignment. Further, the techniques describe how the reassignment can be performed with relatively fine granularity, avoiding the need to perform bulk reassignment of large amounts of data across all nodes merely to reassign ownership of a few data items on one of the nodes.

66 Claims, 2 Drawing Sheets

U.S. PATENT DOCUMENTS

| | | | |
|---|---|---|---|
| 5,675,791 A | 10/1997 | Bhide et al. | |
| 5,740,362 A | 4/1998 | Buickel et al. | |
| 5,845,326 A | 12/1998 | Hirayama et al. | 711/135 |
| 5,892,754 A | 4/1999 | Kompella et al. | |
| 6,011,918 A | 1/2000 | Cohen et al. | |
| 6,088,758 A | 7/2000 | Kaufman et al. | 711/100 |
| 6,253,229 B1 | 6/2001 | Nielsen et al. | |
| 6,311,265 B1 | 10/2001 | Beckerle et al. | |
| 6,321,238 B1 | 11/2001 | Putzolu | |
| 6,341,340 B1 | 1/2002 | Tsukerman et al. | |
| 6,370,619 B1 | 4/2002 | Ho et al. | |
| 6,438,714 B1 | 8/2002 | Canestaro et al. | |
| 6,453,404 B1 | 9/2002 | Bereznyi et al. | 711/171 |
| 6,480,895 B1 | 11/2002 | Gray et al. | |
| 6,567,509 B1 | 5/2003 | Gusler et al. | |
| 6,567,811 B1 | 5/2003 | Edwards et al. | |
| 6,611,899 B1 | 8/2003 | Takahashi et al. | 711/119 |
| 6,636,248 B1 | 10/2003 | Christensen et al. | |
| 6,711,571 B1 | 3/2004 | Putzolu | |
| 6,978,279 B1 | 12/2005 | Lomet et al. | 707/202 |
| 6,981,104 B1 | 12/2005 | Prabhu | 711/144 |
| 2003/0041215 A1 | 2/2003 | George et al. | 711/141 |
| 2004/0172422 A1* | 9/2004 | Putzolu | 707/200 |
| 2004/0215640 A1* | 10/2004 | Bamford et al. | 707/100 |

FOREIGN PATENT DOCUMENTS

| | | | |
|---|---|---|---|
| WO | WO 97/04384 A | 2/1997 | |
| WO | WO 99/44130 A | 9/1999 | |
| WO | WO 02/073416 A | 9/2002 | |
| WO | WO 2005/013155 A1 | 2/2005 | |

OTHER PUBLICATIONS

Chandrasekaran, Sashikanth et al., "Shared Cache—The Future of Parallel Databases" IEEE (2003), pp. 840-850.

Lee, Inseon, et al., "A Single Phase Distributed Commit Protocol for Main Memory Database Systems" IEEE (2002), 8 pages.

Samaras, George et al., "Two-Phase Commit Optimization and Tradeoffs in the Commercial Environment" IEEE (1993), pp. 520-529.

International Search Report for PCT/US2004/024451, 11 pages.

International Searching Authority, "Written Opinion of the International Searching Authority," PCT/US2004/02555, mailing dated Aug. 3, 2005, 11 pages.

Current Claims, PCT/US2004/02555, 7 pages.

International Preliminary Examining Authority, "Notification of Transmittal of the International Preliminary Report of Patentability," PCT/US2004/024425, dated Feb. 6, 2006, 6 pages.

Current Claims, PCT/US2004/024425, 4 pages.

* cited by examiner

OWNERSHIP REASSIGNMENT IN A SHARED-NOTHING DATABASE SYSTEM

RELATED APPLICATIONS

This application claims the benefit of priority from U.S. Provisional Application Ser. No. 60/492,019 entitled "Shared Nothing on Shared Disk Hardware", filed Aug. 1, 2003, which is incorporated by reference in its entirety for all purposes as if fully set forth herein.

This application is related to U.S. Application Ser. No. 10/718,875, entitled "One-Phase Commit in a Shared-Nothing Database System," by Roger Bamford, Sashikanth Chandrasekaran and Angelo Pruscino, filed Nov. 21, 2003; and U.S. Application Ser. No. 10/831,401, entitled "Dynamic Reassignment of Data Ownership," by Roger Bamford, Sashikanth Chandrasekaran and Angelo Pruscino, filed Apr. 23, 2004, and U.S. Application Ser. No. 10/831,413, entitled "Parallel Recovery by Non-Failed Nodes," by Roger Bamford, Sashikanth Chandrasekaran and Angelo Pruscino, filed Apr. 23, 2004, and U.S. Application Ser. No. 10/831,248, entitled "Partitioned Shared Cache," by Roger Bamford, Sashikanth and Angelo Pruscino, filed Apr. 23, 2004

FIELD OF THE INVENTION

The present invention relates to techniques for managing data in a shared-nothing database system running on shared disk hardware.

BACKGROUND OF THE INVENTION

Multi-processing computer systems typically fall into three categories: shared everything systems, shared disk systems, and shared-nothing systems. In shared everything systems, processes on all processors have direct access to all volatile memory devices (hereinafter generally referred to as "memory") and to all non-volatile memory devices (hereinafter generally referred to as "disks") in the system. Consequently, a high degree of wiring between the various computer components is required to provide shared everything functionality. In addition, there are scalability limits to shared everything architectures.

In shared disk systems, processors and memories are grouped into nodes. Each node in a shared disk system may itself constitute a shared everything system that includes multiple processors and multiple memories. Processes on all processors can access all disks in the system, but only the processes on processors that belong to a particular node can directly access the memory within the particular node. Shared disk systems generally require less wiring than shared everything systems. Shared disk systems also adapt easily to unbalanced workload conditions because all nodes can access all data. However, shared disk systems are susceptible to coherence overhead. For example, if a first node has modified data and a second node wants to read or modify the same data, then various steps may have to be taken to ensure that the correct version of the data is provided to the second node.

In shared-nothing systems, all processors, memories and disks are grouped into nodes. In shared-nothing systems as in shared disk systems, each node may itself constitute a shared everything system or a shared disk system. Only the processes running on a particular node can directly access the memories and disks within the particular node. Of the three general types of multi-processing systems, shared-nothing systems typically require the least amount of wiring between the various system components. However, shared-nothing systems are the most susceptible to unbalanced workload conditions. For example, all of the data to be accessed during a particular task may reside on the disks of a particular node. Consequently, only processes running within that node can be used to perform the work granule, even though processes on other nodes remain idle.

Databases that run on multi-node systems typically fall into two categories: shared disk databases and shared-nothing databases.

Shared Disk Databases

A shared disk database coordinates work based on the assumption that all data managed by the database system is visible to all processing nodes that are available to the database system. Consequently, in a shared disk database, the server may assign any work to a process on any node, regardless of the location of the disk that contains the data that will be accessed during the work.

Because all nodes have access to the same data, and each node has its own private cache, numerous versions of the same data item may reside in the caches of any number of the many nodes. Unfortunately, this means that when one node requires a particular version of a particular data item, the node must coordinate with the other nodes to have the particular version of the data item shipped to the requesting node. Thus, shared disk databases are said to operate on the concept of "data shipping," where data must be shipped to the node that has been assigned to work on the data.

Such data shipping requests may result in "pings". Specifically, a ping occurs when a copy of a data item that is needed by one node resides in the cache of another node. A ping may require the data item to be written to disk, and then read from disk. Performance of the disk operations necessitated by pings can significantly reduce the performance of the database system.

Shared disk databases may be run on both shared-nothing and shared disk computer systems. To run a shared disk database on a shared-nothing computer system, software support may be added to the operating system or additional hardware may be provided to allow processes to have access to remote disks.

Shared-nothing Databases

A shared-nothing database assumes that a process can only access data if the data is contained on a disk that belongs to the same node as the process. Consequently, if a particular node wants an operation to be performed on a data item that is owned by another node, the particular node must send a request to the other node for the other node to perform the operation. Thus, instead of shipping the data between nodes, shared-nothing databases are said to perform "function shipping".

Because any given piece of data is owned by only one node, only the one node (the "owner" of the data) will ever have a copy of the data in its cache. Consequently, there is no need for the type of cache coherency mechanism that is required in shared disk database systems. Further, shared-nothing systems do not suffer the performance penalties associated with pings, since a node that owns a data item will not be asked to save a cached version of the data item to disk so that another node could then load the data item into its cache.

Shared-nothing databases may be run on both shared disk and shared-nothing multi-processing systems. To run a shared-nothing database on a shared disk machine, a mechanism may be provided for partitioning the database, and assigning ownership of each partition to a particular node.

The fact that only the owning node may operate on a piece of data means that the workload in a shared-nothing database may become severely unbalanced. For example, in a system of ten nodes, 90% of all work requests may involve data that is owned by one of the nodes. Consequently, the one node is overworked and the computational resources of the other nodes are underutilized. To "rebalance" the workload, a shared-nothing database may be taken offline, and the data (and ownership thereof) may be redistributed among the nodes. However, this process involves moving potentially huge amounts of data, and may only temporarily solve the workload skew.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

Various techniques are described hereafter for improving the performance of a shared-nothing database system that includes a shared disk storage system. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Functional Overview

Various techniques are described hereafter for improving the performance of a shared-nothing database system in which at least two of the nodes that are running the shared-nothing database system have shared access to a disk. As dictated by the shared-nothing architecture of the database system, each piece of data is still owned by only one node at any given time. However, the fact that at least some of the nodes that are running the shared-nothing database system have shared access to a disk is exploited to more efficiently rebalance and recover the shared-nothing database system.

Specifically, techniques are provided for changing the ownership of data in a shared-nothing database without changing the location of the data on persistent storage. Because the persistent storage location for the data is not changed during a transfer of ownership of the data, ownership can be transferred more freely and with less of a performance penalty than would otherwise be incurred by a physical relocation of the data.

Various techniques are also described for providing fast run-time reassignment of ownership. Because the reassignment can be performed during run-time, the shared-nothing system does not have to be taken offline to perform the reassignment. Further, the techniques describe how the reassignment can be performed with relatively fine granularity, avoiding the need to perform bulk reassignment of large amounts of data across all nodes merely to reassign ownership of a few data items on one of the nodes.

Exemplary Cluster That Includes Shared Disk Systems

Figure 1:
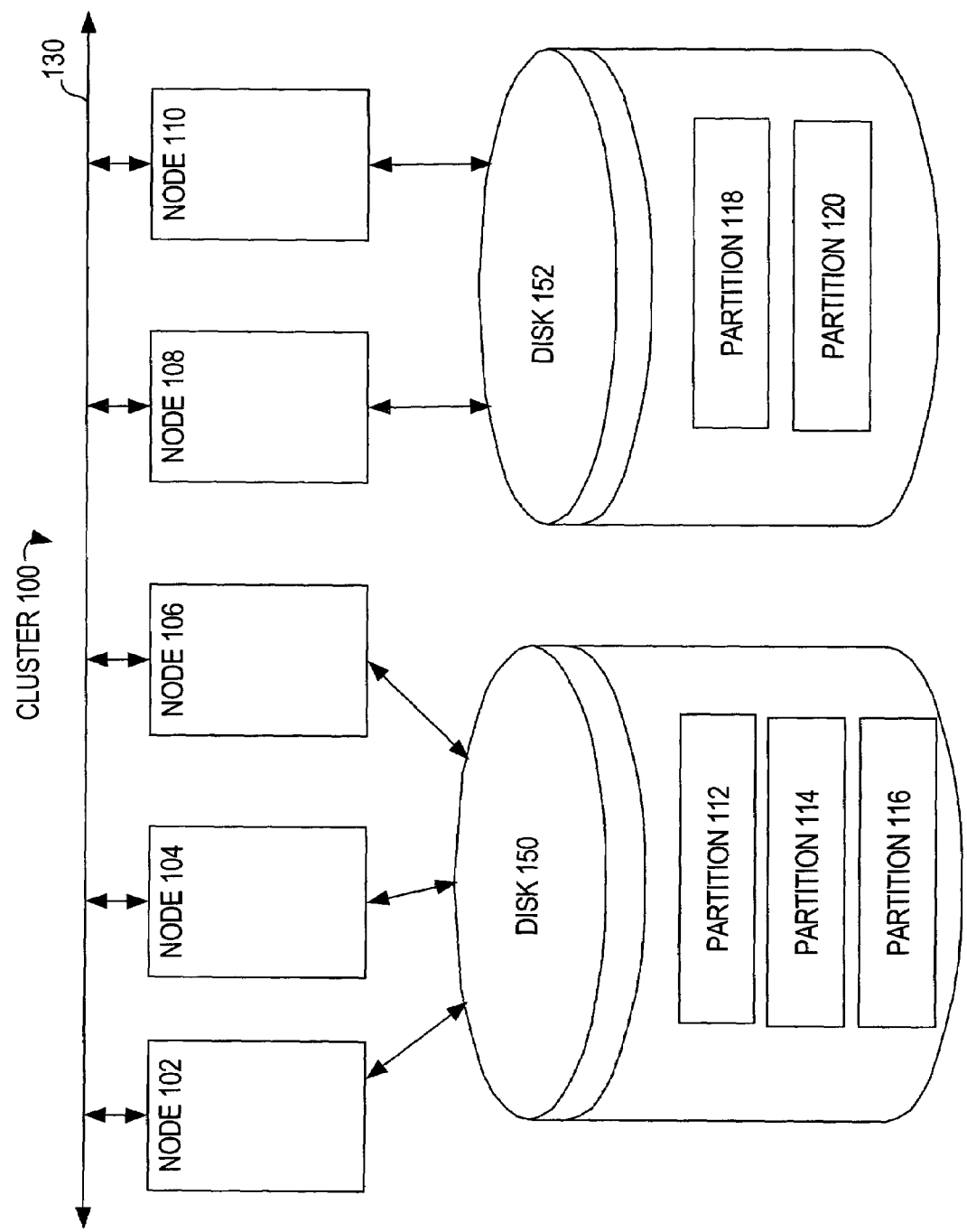
FIG. 1 is a block diagram illustrating a cluster that includes two shared disk subsystems, according to an embodiment of the invention.

FIG. 1 is a block diagram illustrating a cluster 100 upon which embodiments of the invention may be implemented. Cluster 100 includes five nodes 102, 104, 106, 108 and 110 that are coupled by an interconnect 130 that allows the nodes to communicate with each other. Cluster 100 includes two disks 150 and 152. Nodes 102, 104 and 106 have access to disk 150, and nodes 108 and 110 have access to disk 152. Thus, the subsystem that includes nodes 102, 104 and 106 and disk 150 constitutes a first shared disk system, while the subsystem that includes nodes 108 and 110 and disk 152 constitutes a second shared disk system.

Cluster 100 is an example of a relatively simple system that includes two shared disk subsystems with no overlapping membership between the shared disk subsystems. Actual systems may be much more complex than cluster 100, with hundreds of nodes, hundreds of shared disks, and many-to-many relationships between the nodes and shared disks. In such a system, a single node that has access to many disks may, for example, be a member of several distinct shared disk subsystems, where each shared disk subsystem includes one of the shared disks and all nodes that have access to the shared disk.

Shared-Nothing Database on Shared Disk System

For the purpose of illustration, it shall be assumed that a shared-nothing database system is running on cluster 110, where the database managed by the shared-nothing database system is stored on disks 150 and 152. Based on the shared-nothing nature of the database system, the data may be segregated into five groups or partitions 112, 114, 116, 118 and 120. Each of the partitions is assigned to a corresponding node. The node assigned to a partition is considered to be the exclusive owner of all data that resides in that partition. In the present example, nodes 102, 104, 106, 108 and 110 respectively own partitions 112, 114, 116, 118 and 120. The partitions 112, 114 and 118 owned by the nodes that have access to disk 150 (nodes 102, 104 and 106) are stored on disk 150. Similarly, the partitions 118 and 120 owned by the nodes that have access to disk 152 (nodes 108 and 110) are stored on disk 152.

As dictated by the shared-nothing nature of the database system running on cluster 100, any piece of data is owned by at most one node at any given time. In addition, access to the shared data is coordinated by function shipping. For example, in the context of a database system that supports the SQL language, a node that does not own a particular piece of data may cause an operation to be performed on that data by forwarding fragments of SQL statements to the node that does own the piece of data.

Ownership Map

To efficiently perform function shipping, all nodes need to know which nodes own which data. Accordingly, an ownership map is established, where the ownership map indicates the data-to-node ownership assignments. During runtime, the various nodes consult the ownership map to route SQL fragments to the correct nodes at run-time.

According to one embodiment, the data-to-node mapping need not be determined at compilation time of an SQL (or any other database access language) statement. Rather, as shall be described in greater detail hereafter, the data-to-node mapping may be established and revised during runtime. Using the techniques described hereafter, when the ownership changes from one node that has access to the disk on which the data resides to another node that has access to the disk on which the data resides, the ownership change is performed without moving the data from its persistent location on the disk.

Locking

Locks are structures used to coordinate access to a resource among several entities that have access to the resource. In the case of a shared-nothing database system, there is no need for global locking to coordinate accesses to the user data in the shared-nothing database, since any given piece of data is only owned by a single node. However, since all of the nodes of the shared-nothing database require access to the ownership map, some locking may be required to prevent inconsistent updates to the ownership map.

According to one embodiment, a two-node locking scheme is used when ownership of a piece of data is being reassigned from one node (the "old owner") to another node (the "new owner"). Further, a global locking mechanism may be used to control access to the metadata associated with the shared-nothing database. Such metadata may include, for example, the ownership map.

Transfer of Ownership Without Moving Data

According to one aspect of the invention, ownership of data can be changed from one node (the old owner) to another node (the new owner) that has connectivity to the data without data movement. For example, assume that a particular data item currently resides in partition 112. Because the data item resides in partition 112, the data item is owned by node 102. To change ownership of the data to node 104, the data must cease to belong to partition 112 and instead belong to partition 114. In a conventional implementation of a shared-nothing database system, such a change of ownership would typically cause the data item to actually be moved from one physical location on disk 150 that corresponds to partition 112 to another physical location on disk 150 that corresponds to partition 114.

In contrast, according to an embodiment of the invention, partitions 112 and 114 are not physical partitions that are bound to specific locations of disk 150. Rather, partitions 112 and 114 are location-independent partitions that merely represent the sets of data items that are currently owned by nodes 102 and 104, respectively, regardless of where the specific data items reside on disk 152. Thus, because partitions 112 and 114 are location-independent, data items can be moved from one partition to the other (i.e. assigned from one owner to the other) without any actual movement of the data on disk 150.

While changing the ownership of a data item does not require movement of the data item, it does require a change in the ownership map. Unlike the user data in the shared-nothing database, the ownership map is shared among the various nodes. Consequently, portions of the ownership map may be cached in the private caches of the various nodes. Therefore, in response to the change of ownership of a data item, the ownership map is changed, and the cached copies of the affected portion of the ownership map are invalidated.

According to an alternative embodiment, ownership change is implemented similar to a schematic change to the underlying object. Specifically, after the change is made to the ownership map, compiled statements that reference the ownership map are invalidated and recompiled to use the new ownership map.

Node Additions and Removals

During the operation of cluster 100, it may be desirable to add or remove nodes from the cluster 100. In conventional shared-nothing systems, such operations would involve moving large amounts of data, frequently from one physical partition of a file or disk to another physical partition in another file or disk. By using location-independent partitions, the only data that must be physically relocated is data whose ownership is being transferred to a node that does not have access to the disk on which the data currently resides.

For example, assume that a new node X is added to cluster 100, and that node X has access to disk 152 but not to disk 150. To rebalance the workload between the nodes, some data that is currently owned by nodes 102–110 may be reassigned to node X. Because the data whose old owners are nodes 102–106 resides on disk 150 to which node X does not have access, the data must be physically moved to disk 152 to which node X has access. However, because the data whose old owners are nodes 108 and 110 already resides on disk 152 to which node X has access, the ownership of that data may be transferred to node X by updating the ownership map without moving the actual data.

Similarly, when a node is removed from cluster 100, only those data items that are transferred to a node that does not currently have access to the disk on which the data items reside need to be physically relocated. Those data items whose ownership is transferred to a node that has access to the disk on which the data resides need not be moved. For example, if node 102 is removed from cluster 100 and ownership of all of the data items previously owned by node 102 is transferred to node 104, then none of the data items will need to be physically relocated in response to the change of ownership.

Gradual Transfer of Ownership

According to one embodiment, the performance penalty associated with the bulk reassignment of data ownership in response to added or removed nodes is lessened by performing the ownership transfer gradually rather than all at once. For example, when a new node is added to a cluster, rather than transfer the ownership of enough data to have the new node as busy as the existing nodes, the system may instead initially transfer ownership of few or no data items to the new node. According to one embodiment, ownership is gradually transferred based on workload needs. For example, the transfer of ownership of data may be triggered when the system detects that one of the nodes is getting overworked. In response to detecting that a node is overworked, some of the data items that belong to the overworked node may be assigned to the previously added node. Gradually more and more data items may be reassigned from the overworked node to the new node until it is detected that the overworked node is no longer overworked.

On the other hand, the reassignment of ownership may be triggered when the workload on an existing node falls below a certain threshold. Specifically, it may be desirable to transfer some ownership responsibilities from an otherwise busy node to the new node when the workload of the busy node lessens in order to avoid having the reassignment operation reduce the performance of an already overworked node.

With respect to the gradual transfer of ownership from a removed node, the ownership transfers may be triggered, for example, by necessity. For example, if a data item X was owned by a removed node, then data item X may be reassigned to another node upon detecting that some node has requested an operation that involves data item X. Similarly, transfer of ownership from a removed node to an existing node may be triggered when the workload of the existing node falls below a certain threshold.

Bucket-based Partitioning

As mentioned above, the data that is managed by the shared-nothing database is partitioned, and the data in each partition is exclusively owned by one node. According to one embodiment, the partitions are established by assigning the data to logical buckets, and then assigning each of the buckets to a partition. Thus, the data-to-node mapping in the ownership map includes a data-to-bucket mapping, and a bucket-to-node mapping.

According to one embodiment, the data-to-bucket mapping is established by applying a hash function to the name of each data item. Similarly, the bucket-to-node mapping may be established by applying another hash function to identifiers associated with the buckets. Alternatively, one or both of the mappings may be established using range-based partitioning, or may by simply enumerating each individual relationship. For example, one million data items may be mapped to fifty buckets by splitting the namespace of the data items into fifty ranges. The fifty buckets may then be mapped to five nodes by storing a record for each bucket that (1) identifies the bucket and (2) identifies the node currently assigned the bucket.

The use of buckets significantly reduces the size of the ownership mapping relative to a mapping in which a separate mapping record was stored for each data item. Further, in embodiments where there number of buckets exceeds the number of nodes, the use of buckets makes it relatively easy to reassign ownership to a subset of the data owned by a given node. For example, a new node may be assigned a single bucket from a node that is currently assigned ten buckets. Such a reassignment would simply involve revising the record that indicates the bucket-to-node mapping for that bucket. The data-to-bucket mapping of the reassigned data would not have to be changed.

As mentioned above, the data-to-bucket mapping may be established using any one of a variety of techniques, including but not limited to hash partitioning, range partitioning or list values. If range based partitioning is used and the number of ranges is not significantly greater than the number of nodes, then the database server may employ finer grained (narrower) ranges to achieve the desired number of buckets so long as the range key used to partition the data items is a value that will not change (e.g. date). If the range key is a value that could change, then in response to a change to the range key value for a particular data item, the data item is removed from its old bucket and added to the bucket that corresponds to the new value of the data item's range key.

Tree-based Partitioning

Another way of partitioning the data items managed by the database system into subsets is to have a hierarchical sorted structure (e.g. BTree) such that the upper level(s) of the tree structure (e.g. root) are owned by all nodes, and the lower levels (e.g. leaf nodes) are partitioned among nodes. According to one embodiment, the tree structure includes a plurality of subtrees, where each subtree is assigned to a particular node. Further, each lower level tree node corresponds to a set of data. The set of data associated with a lower level tree node is owned by the node associated with the subtree that includes that tree node.

In such an embodiment, when ownership of subtrees change, the upper levels are invalidated through a locking/broadcast scheme. The pointers at the lower levels are modified to move ownership of a subtree under a different node.

Handling Dirty Versions During Reassignment

As mentioned above, when the new owner of data has access to the disk on which the data resides, ownership of data is changed by reassigning buckets to nodes without physically moving the physical location of the data on disk. However, it is possible that the old owner has in its volatile memory one or more "dirty" versions of the reassigned data item. A dirty version of a data item is a version that includes changes that are not reflected on the version that currently resides on disk.

According to one embodiment, dirty versions of data items are written to the shared-disk as part of the ownership transfer operation. Consequently, when the new owner reads from disk a data item for which it has recently acquired ownership, the version of the item read by the new owner will reflect the most recent changes made by the previous owner.

Alternatively, to avoid the overhead associated with writing the dirty versions of data items to disk, the dirty versions of the data items can be purged from the volatile memory of the old owner before the dirty data items are written to the shared disk if redo is forced and not over-written. Specifically, when the owning node makes a change to a data item, a "redo" record is generated that reflect the change. As long as the redo record for the change is forced to disk on or before the change of ownership of the data item, the old owner can purge the dirty version of the data item without first saving the dirty version to disk. In this case, the new owner can reconstruct the most recent version of the data item by (1) reading the redo record to determine what changes must be made to the disk version of the data item and (2) making the indicated changes to the disk version of the data item.

As another alternative, the dirty data items are transferred to the new owner's cache either voluntarily (proactively by the old owner) or on demand (in response to requests from the new owner) as transactions request the data in the new owner's node.

Changes to a data item may be reflected in multiple recovery logs if the dirty versions of data items are not flushed to disk before ownership change. For example, assume that a first node makes a change to a data item, and then ownership of the data item is transferred to a second node. The first node may flush the redo log to disk, but transfer the dirty version of the data item directly to the second node without first storing it on disk. The second node may then make a second change to the data item. Assume that the second node flushes to disk a redo record for the second change, and then the second node fails before storing the dirty version of the data item to disk. Under these circumstances, the changes that have to be reapplied to the disk version of the data item are reflected in both the redo log of the first node, and the redo log of the second node. According to one embodiment, online recovery is performed by merging the redo logs to recover data item.

According to one embodiment, ownership of a data item may be transferred without waiting for the transaction that is modifying the data item to commit. Consequently, changes made by a single transaction to the data item, may be spread across multiple redo logs. Under these circumstances, the transaction rollback mechanism of the database server is configured to undo changes from multiple logs, where the undo operations are performed on a data block in an order that is reverse relative to the order in which the changes were made to a data block. In addition, a media recovery mechanism is provided that merges the redo logs from all owners, where the merge process involves the redo records for all changes made since data was backed up.

Reassignment Without Blocking Updates

According to one aspect of the invention, reassignment of ownership of data items is performed without blocking updates to the data that is being reassigned. According to one embodiment, the ownership assignment is performed without blocking updates by causing the database server to wait for all transactions accessing any data items that belong to a reassigned bucket to commit, and for all dirty data items belonging to the bucket to be flushed to disk. Under these conditions, data belonging to a reassigned bucket can be updated immediately (without waiting for dirty versions to be flushed to disk) if the old owner did not have exclusive-mode or shared mode access to the data. If the old owner did have exclusive-mode access to the data, then the old owner may have dirty versions of the data in its cache, so updates are delayed until the old owner writes the dirty pages (or the redo for the associated changes) to shared disk.

Prior to allowing new updates to a data item whose ownership has been newly transferred, the database server may be configured to wait for in-progress updates that have been requested of the old owner to complete. On the other hand, the database server may be configured to abort the in-progress operations and then reissue the transactions to new owner. According to one embodiment, a determination is made as to whether to wait for a given in-progress operation to complete based on a variety of factors. Such factors may include, for example, how much work has already been done for the operation.

Under certain situations, waiting for the updates that have been requested of the old owner to be completed may create false deadlocks. For example, assume row A is in bucket 1 and rows B, and C are in bucket 2. Assume that a transaction T1 updated row A, and another transaction T2 has updated row B. Assume that at this point, ownership of bucket 2 is remapped to a new node. If at this point T1 wants to update row C, T1 will wait for the remapping to complete. Thus, T1 will wait for T2. If T2 wants to update row A, then there is a deadlock between T1 and T2.

According to one embodiment, even when ownership of several buckets is desired, the ownership transfer is performed one bucket at a time to minimize the amount of time a transaction will have to wait in order to access data in the reassigned bucket.

Techniques for Transferring Ownership

The following examples illustrate techniques for transferring ownership of data, within a shared-nothing database implemented on a shared disk system, according to various embodiments of the invention. In the following example, it is assumed that the ownership of the data is changed while transactions that have modified the data are still active. That is, the database system does not wait for in-progress transactions that have accessed the to-be-reassigned data to quiesce.

One technique for transferring ownership shall be described in reference to an example in which it is assumed that ownership of a subset of an object ("bucket B") is changed from node X to node Y. According to one embodiment, the database system initially marks the bucket B as being "in transit" from X to Y. The change in ownership map is then broadcast to all nodes, or invalidated through global locking.

According to one embodiment, query execution plans that involve data in bucket B are regenerated in response to the ownership map change. Alternatively, the cached map is invalidated and reloaded in response to the ownership map change.

After the reassignment, any new sub-queries/dml fragments that access data in bucket B will be shipped to node Y. Optionally, SQL fragments currently running in X can be rolled back before the bucket is marked as being in transit from X to Y. These fragments may then be reissued to node Y after the reassignment. It should be noted that the transaction to which these fragments belong is not itself rolled back, but rather only the current call is rolled back and resent to the new owner. In particular, changes made by node X to data in bucket B in previous calls are untouched.

According to one embodiment, node X can detect that there are no in-progress calls that are accessing data in bucket B through a simple local locking scheme. The locking scheme may involve, for example, causing every process accessing data in a bucket to get a shared lock/latch on the bucket. When the bucket is to be reassigned, the process performing the reassignment waits until it can get an exclusive lock/latch on the bucket. By obtaining an exclusive lock/latch on the bucket, the reassignment process ensures that no other process is currently accessing the bucket.

According to one embodiment, node X does not wait for all calls to complete successfully before marking the bucket as in-transit because of potential deadlocks. The following is an example of how such deadlocks could occur. Consider three rows, 1, 2 & 3 in a bucket that will be remapped.

The following sequence of events can lead to a deadlock.
(a) T1 updates row 2.
(b) T2 does a multi-row update of row 1 followed by row 2. T2 now waits for T1.
(c) It is decided that the bucket will be remapped.
(d) T1 wants to update row 3. T1 now waits for T2.

According to one embodiment, the forced abort of in-progress calls at node X is avoided by allowing in-progress calls continue to execute normally as long as the data they access from bucket B is in cache. In other words, X cannot read a block from disk for bucket B without inter-node locking. If there is a cache miss and the bucket is in transit, X must send a message to Y and either retrieve the block from Y or read the block from disk. While the bucket is in transit a cache coherence protocol is used between X and Y.

Handling Requests at the New Owner

After bucket B has been reassigned to node Y, any new SQL fragments that need to access the data in bucket B start executing in node Y. The technique used by node Y when reading newly transferred data items from disk may vary based on what the previous owner node X did before the bucket was marked as in-transit. The following cases are examples that illustrate how different scenarios may be handled by the new owner node Y.

Case A: Assume that node X aborted all in-progress calls and wrote all dirty blocks mapping to this bucket to shared disk. For efficiency, each node can link dirty data items to a per-bucket object queue. Under these conditions, node Y can directly read from disk. There is no need for any cache coherence. Node Y is immediately marked as the new owner for this bucket.

Case B: Assume that node X aborted all in-progress calls but dirty data items are not written out. Under these conditions, node Y will need to retrieve or verify that node X does not have a dirty copy before reading a block from disk. If X has a dirty copy, then a past image is left in node X for recovery as well as to ensure that the checkpoint does not advance past a change made in node X that has not yet been reflected in disk by a block write in node Y. After all dirty data items in X have been written (either by itself or a past image (PI) purged by a write in Y), the bucket state is changed from in-transit to Y as the owner. Y can now access disk blocks in this bucket without checking with X.

If node X fails while the bucket state is in-transit, the recovering node (node Y if it survives) will need to apply redo generated for this bucket in node X (and then perhaps redo generated in node Y if it failed too) if node Y does not have the current copy of the data item.

Case C: Assume that node X aborted in-progress calls and purges dirty data items. Under these conditions, node Y can directly read the block from disk without cache coherence. However the block may need to be brought up-to-date if there is unapplied redo in X. The bucket will be considered in-transit until all the redo generated in X has been applied by Y and written to disk. This is needed to prevent X from advancing its checkpoint past a piece of redo that has not yet been reflected in disk.

If node X fails while the bucket state is in-transit, then the recovering node (node Y if it survives) will need to apply redo generated for this bucket in node X (and then perhaps redo generated in node Y if it failed too) if node Y does not have the current copy of the data item.

Case D: Assume that node X continues to execute in-progress calls. Both node X and node Y will need to check with the other before accessing a block from disk. When all in-progress calls have completed and all blocks are either written out or transferred to Y, Y is marked as the new owner. From this point there is no need for cache coherence.

If node X or node Y fails while the bucket is in-transit, a recovery must be performed. The recovery techniques used in this context may be similar to those described in U.S. Pat. No. 6,353,836, and U.S. patent application Ser. No. 10/092, 047 filed Mar., 4, 2002, each of which is incorporated herein in its entirety. If both nodes fail, then the redo logs from X and Y will need to be merged.

Various benefits result from allowing node X to continue to execute in-progress calls, as described in Case D. Specifically, allowing node X to continue to execute in-progress calls allows for the ownership to be reassigned with minimum impact on ongoing transactions. However, it requires a cache coherence and recovery scheme to be implemented between the nodes X and Y for the bucket B.

One approach for providing cache coherency under these circumstances involves having node X obtain locks for all data items that it has currently cached for bucket B. The master/directory node for all data items in B can be assigned as node Y. A notification is then sent to all nodes that bucket B will be moved from X to Y. This notification invalidates/updates the ownership map such that further accesses to B will be sent to Y.

If there is a failure before this point, the ownership reassignment operation is aborted. Otherwise the map is updated to indicate that Y is the new owner and that cache coherence is in effect.

A cache coherence protocol, such as the protocol described in U.S. Pat. No. 6,353,836, and U.S. patent application Ser. No. 10/092,047 is then executed by X and Y for all data items in bucket B. When there are no more dirty data items in B, the cache coherence protocol can be stopped. Y can release any locks that it might have obtained for data items in B.

According to one embodiment, a cache coherence protocol is always in effect such that the node that owns a bucket is also the master for those locks. In most cases, each node would only allocate a local lock (because it is the master) and cache coherence messages will be needed only when the ownership changes. When ownership changes, the locks opened in this bucket can be dynamically remastered to the new owner.

Modifications Before Ownership Change

According to an embodiment, a sub-transaction that modified data in node X before the ownership change will still be considered active because these changes will be needed for transaction rollback. If a transaction rolls back and it had made changes to this bucket in node X, node Y will need to apply undo logs by reading it from X's part of the shared disk logs.

A sub-transaction that modified data in node X before the ownership change might update the same data in node Y. This requires that requests for transactional locks such as row locks or page locks in node Y need to be coordinated with node X. If a sub-transaction requests a lock and the lock is already held by its sibling transaction in node X, then the lock request is granted. However, if the lock is held by an unrelated transaction, then the lock request is blocked. The waits-for-graph reflects this wait as a wait on the parent transaction so that global deadlocks can be detected. Once the ownership change is complete and all transactions that had acquired locks to access data in bucket B in node X have completed (committed or aborted), only local locks are needed for transactional locks.

Requests for transactional locks can always be coordinated locally by causing the database server to wait for transactions to complete before initiating the change in ownership.

Hardware Overview

Figure 2:
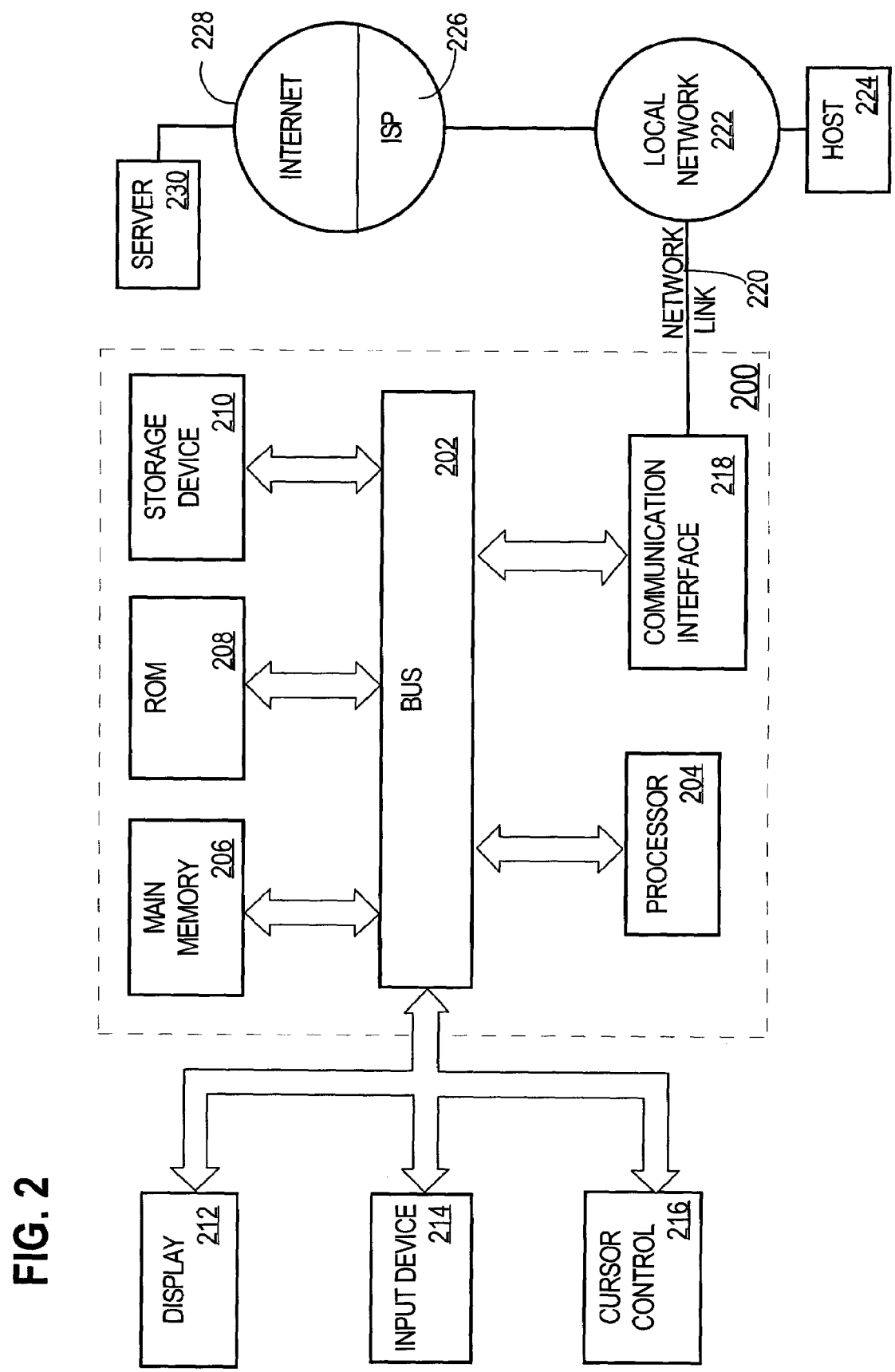
FIG. 2 is a block diagram of a computer system on which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the world wide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

The received code may be executed by processor 204 as it is received, and/or stored in storage device 210, or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for managing data, comprising:
maintaining a plurality of persistent data items on persistent storage accessible to a plurality of nodes, the persistent data items including a particular data item stored at a particular location on said persistent storage;
assigning exclusive ownership of each of the persistent data items to one of the nodes, wherein a particular node of said plurality of nodes is assigned exclusive ownership of said particular data item;
when any node wants an operation performed that involves said particular data item, the node that desires the operation to be performed ships the operation to the particular node for the particular node to perform the operation on the particular data item while said particular data item continues to reside at said particular location;
reassigning ownership of the particular data item from the particular node to another node without moving the particular data item from said particular location on said persistent storage;
after the reassignment, when any node wants an operation performed that involves said particular data item, the node that desires the operation to be performed ships the operation to said other node for the other node to perform the operation on the particular data item while said particular data item continues to reside at said particular location,
wherein:
said persistent storage is a first persistent storage of a plurality of persistent storages used by a multi-node database system,
the method further comprises reassigning ownership of a second data item from a first node that has access to said first persistent storage to a second node that has access to a second persistent storage but does not have access to said first persistent storage, and
the method further comprises reassigning ownership of the second data item by moving the second data item from said first persistent storage to said second persistent storage.

2. The method of claim 1 wherein the step of reassigning ownership of the particular data item from the particular node to another node includes updating an ownership map that is shared among the plurality of nodes.

3. A method for managing data, comprising:
maintaining a plurality of persistent data items on persistent storage accessible to a plurality of nodes, the persistent data items including a particular data item stored at a particular location on said persistent storage;
assigning exclusive ownership of each of the persistent data items to one of the nodes, wherein a particular node of said plurality of nodes is assigned exclusive ownership of said particular data item;
when any node wants an operation performed that involves said particular data item, the node that desires the operation to be performed ships the operation to the particular node for the particular node to perform the operation on the particular data item;
while the particular node continues to operate, reassigning ownership of the particular data item from the particular node to another node;
after the reassignment, when any node wants an operation performed that involves said particular data item, the node that desires the operation to be performed ships the operation to said other node for the other node to perform the operation on the particular data item,
wherein:
said persistent storage is a first persistent storage of a plurality of persistent storages used by said multi-node database system; and
the method further comprises reassigning ownership of a second data item from a first node that has access to said first persistent storage to a second node that has access to a second persistent storage but does not have access to said first persistent storage; and
wherein the step of reassigning ownership of the second data item includes moving the second data item from said first persistent storage to said second persistent storage.

4. The method of claim 3, wherein the plurality of nodes are nodes of a multi-node database system.

5. The method of claim 4 wherein the multi-node database system includes nodes that do not have access to said first persistent storage.

6. The method of claim 5 wherein the step of reassigning ownership of the particular data item from the particular node to another node is performed in response to the addition of said other node to said multi-node database system.

7. The method of claim 5 wherein:
the step of reassigning ownership of the particular data item from the particular node to another node is performed in anticipation of the removal of said particular node from said multi-node database system; and
the method further comprises the step of, in anticipation of the removal of said particular node from said multi-node database system, physically moving from said persistent storage to another persistent storage a second data item that is reassigned from said particular node to a node of said multi-node database system that does not have access to said persistent storage.

8. The method of claim 5 wherein the step of reassigning ownership of the particular data item from the particular node to another node is performed as part of a gradual transfer of ownership from said particular node to one or more other nodes.

9. The method of claim 8 wherein the gradual transfer is initiated in response to detecting that said particular node is overworked relative to one or more other nodes in said multi-node database system.

10. A method for managing data, comprising:
maintaining a plurality of persistent data items on persistent storage accessible to a plurality of nodes, the persistent data items including a particular data item stored at a particular location on said persistent storage, wherein the plurality of nodes are nodes of a multi-node database system;
assigning exclusive ownership of each of the persistent data items to one of the nodes, wherein a particular node of said plurality of nodes is assigned exclusive ownership of said particular data item;
when any node wants an operation performed that involves said particular data item, the node that desires the operation to be performed ships the operation to the particular node for the particular node to perform the operation on the particular data item;
while the particular node continues to operate, reassigning ownership of the particular data item from the particular node to another node;
wherein the step of reassigning ownership of the particular data item from the particular node to said other node is performed as part of a gradual transfer of ownership from said particular node to one or more other nodes in said multi-node database system,
wherein the gradual transfer is initiated in response to detecting that said particular node is overworked relative to the one or more other nodes,
wherein the gradual transfer is terminated in response to detecting that said particular node is now longer overworked relative to the one or more other nodes; and
after the reassignment, when any node wants an operation performed that involves said particular data item, the node that desires the operation to be performed ships the operation to said other node for the other node to perform the operation on the particular data item.

11. A method for managing data, comprising:
maintaining a plurality of persistent data items on persistent storage accessible to a plurality of nodes, the persistent data items including a particular data item stored at a particular location on said persistent storage,
wherein the plurality of nodes are nodes of a multi-node database system;
assigning exclusive ownership of each of the persistent data items to one of the nodes, wherein a particular node of said plurality of nodes is assigned exclusive ownership of said particular data item;
when any node wants an operation performed that involves said particular data item, the node that desires the operation to be performed ships the operation to the particular node for the particular node to perform the operation on the particular data item;
while the particular node continues to operate, reassigning ownership of the particular data item from the particular node to another node;
wherein the step of reassigning ownership of the particular data item from the particular node to another node is performed as part of a gradual transfer of ownership to said other node by one or more other nodes, wherein said gradual transfer is initiated in response to detecting that said other node is underworked relative to the one or more other nodes in said multi-node database system;
after the reassignment, when any node wants an operation performed that involves said particular data item, the node that desires the operation to be performed ships the operation to said other node for the other node to perform the operation on the particular data item.

12. A method for managing data, comprising:
maintaining a plurality of persistent data items on persistent storage accessible to a plurality of nodes, the persistent data items including a particular data item stored at a particular location on said persistent storage;
assigning exclusive ownership of each of the persistent data items to one of the nodes, wherein a particular node of said plurality of nodes is assigned exclusive ownership of said particular data item;
when any node wants an operation performed that involves said particular data item, the node that desires the operation to be performed ships the operation to the particular node for the particular node to perform the operation on the particular data;
while the particular node continues to operate, reassigning ownership of the particular data item from the particular node to another node;
after the reassignment, when any node wants an operation performed that involves said particular data item, the node that desires the operation to be performed ships the operation to said other node for the other node to perform the operation on the particular data item; and after a first node has been removed from the multi-node system, continuing to have a set of data items owned by the first node.

13. The method of claim 12, further comprising:
reassigning ownership of a data item from the first node to a second node in response to detecting that the workload of said second node has fallen below a predetermined threshold.

14. The method of claim 1 wherein:
at the time said particular data item is to be reassigned to said other node, the particular node stores a dirty version of said particular data item in volatile memory; and
the step of reassigning ownership of the particular data item from the particular node to another node includes writing said dirty version of said particular data item to said persistent storage.

15. A method for managing data, comprising:
maintaining a plurality of persistent data items on persistent storage accessible to a plurality of nodes, the persistent data items including a particular data item stored at a particular location on said persistent storage;
assigning exclusive ownership of each of the persistent data items to one of the nodes, wherein a particular node of said plurality of nodes is assigned exclusive ownership of said particular data item;
when any node wants an operation performed that involves said particular data item, the node that desires the operation to be performed ships the operation to the particular node for the particular node to perform the operation on the particular data item;
while the particular node continues to operate, reassigning ownership of the particular data item from the particular node to another node,
wherein:
 at the time said particular data item is to be reassigned to said other node, the particular node stores a dirty version of said particular data item in volatile memory; and
 the step of reassigning ownership of the particular data item from the particular node to another node includes forcing to persistent storage one or more redo records associated with said dirty version, and purging said dirty version from said volatile memory without writing said dirty version of said particular data item to said persistent storage; and
 said other node reconstructs said dirty version by applying said one or more redo records to the version of the particular data item that resides on said persistent storage.

16. A method for managing data, comprising:
maintaining a plurality of persistent data items on persistent storage accessible to a plurality of nodes, the persistent data items including a particular data item stored at a particular location on said persistent storage;
assigning exclusive ownership of each of the persistent data items to one of the nodes, wherein a particular node of said plurality of nodes is assigned exclusive ownership of said particular data item;
when any node wants an operation performed that involves said particular data item, the node that desires the operation to be performed ships the operation to the particular node for the particular node to perform the operation on the particular data item;
while the particular node continues to operate, reassigning ownership of the particular data item from the particular node to another node, wherein:
at the time said particular data item is to be reassigned to said other node, the particular node stores a dirty version of said particular data item in volatile memory; and
the method further includes the step of transferring the dirty version of said particular data item from volatile memory associated with said particular node to volatile memory associated with said other node.

17. The method of claim 16 wherein the step of transferring the dirty version is performed proactively by the particular node without the other node requesting the dirty version.

18. The method of claim 16 wherein the step of transferring the dirty version is performed by the particular node in response to a request for the dirty version from said other node.

19. A method for managing data, comprising:
maintaining a plurality of persistent data items on persistent storage accessible to a plurality of nodes, the persistent data items including a particular data item stored at a particular location on said persistent storage;
assigning exclusive ownership of each of the persistent data items to one of the nodes, wherein a particular node of said plurality of nodes is assigned exclusive ownership of said particular data item;
when any node wants an operation performed that involves said particular data item, the node that desires the operation to be performed ships the operation to the particular node for the particular node to perform the operation on the particular data item;
reassigning ownership of the particular data item from the particular node to another node,
wherein:
the step of reassigning ownership of the particular data item from the particular node to another node is performed without waiting for a transaction that is modifying the data item to commit;
the transaction makes a first set of modifications while the particular data item is owned by the particular node; and
the transaction makes a second set of modifications while the particular data item is owned by said other node.

20. The method of claim 19 further comprising rolling back changes made by said transaction by rolling back the second set of modifications based on undo records in an undo log associated with said other node, and rolling back the first set of modifications based on undo records in an undo log associated with said particular node.

21. A method for managing data, comprising:
maintaining a plurality of persistent data items on persistent storage accessible to a plurality of nodes, the persistent data items including a particular data item stored at a particular location on said persistent storage;
assigning exclusive ownership of each of the persistent data items to one of the nodes, wherein a particular node of said plurality of nodes is assigned exclusive ownership of said particular data item;
when any node wants an operation performed that involves said particular data item, the node that desires the operation to be performed ships the operation to the particular node for the particular node to perform the operation on the particular data item;
while the particular node continues to operate, reassigning ownership of the particular data item from the particular node to another node;
the other node receiving a request to update said data item;
determining whether the particular node held exclusive-mode or shared-mode access to the data item; and
if the particular node did not hold exclusive-mode or shared-mode access to the data item, then the other node updating the particular data item without waiting for the particular node to flush any dirty version of the data item, or redo for the dirty version, to persistent storage.

22. The method of claim 1 further comprising the steps of:
in response to transferring ownership of said particular data item to said other node, aborting an in-progress operation that involves said particular data item;
after ownership of the particular data item has been transferred to said other node, re-executing the in-progress operation.

23. The method of claim 1 wherein:
an operation that involves said particular data item is in-progress at the time the transfer of ownership of said particular data item is to be performed;
the method further includes the step of determining whether to wait for said in-progress operation to complete based on a set of one or more factors; and
if it is determined to not wait for said in-progress operation to complete, aborting said in-progress operation.

24. The method of claim 23 wherein said set of one of more factors includes how much work has already been performed by said in-progress operation.

25. A method of managing data, the method comprising the steps of:
maintaining a plurality of persistent data items on persistent storage accessible to a plurality of nodes;
assigning ownership of each of the persistent data items to one of the nodes by assigning each data item to one of a plurality of buckets by enumerating individual data-item-to-bucket relationships; and
assigning each bucket to one of the plurality of nodes by enumerating individual bucket-to-node relationships;
wherein the node to which a bucket is assigned is established to be owner of all data items assigned to the bucket;
when a first node wants an operation performed that involves a data item owned by a second node, the first node ships the operation to the second node for the second node to perform the operation.

26. The method of claim 25 wherein the step of assigning each data item to one of a plurality of buckets is performed by applying a hash function to a name associated with each data item.

27. The method of claim 25 wherein the step of assigning each bucket to one of the plurality of nodes is performed by applying a hash function to an identifier associated with each bucket.

28. The method of claim 25 wherein the step of assigning each data item to one of a plurality of buckets is performed using range-based partitioning.

29. The method of claim 25 wherein the step of assigning each bucket to one of the plurality of nodes is performed using range-based partitioning.

30. The method of claim 25 wherein the number of buckets is greater than the number of nodes, and the bucket-to-node relationship is a many-to-one relationship.

31. The method of claim 25 further comprising the step of reassigning from a first node to a second node ownership of all data items that are mapped to a bucket by modifying a bucket-to-node mapping without modifying a data-item-to-bucket mapping.

32. A computer-readable storage medium carrying one or more sequences of instructions which, when executed by one or more processors, causes the one or more processors to perform the method recited in claim 1.

33. A computer-readable storage medium carrying one or more sequences of instructions which, when executed by one or more processors, causes the one or more processors to perform the method recited in claim 2.

34. A computer-readable storage medium carrying one or more sequences of instructions which, when executed by one or more processors, causes the one or more processors to perform the method recited in claim 3.

35. A computer-readable storage medium carrying one or more sequences of instructions which, when executed by one or more processors, causes the one or more processors to perform the method recited in claim 4.

36. A computer-readable storage medium carrying one or more sequences of instructions which, when executed by one or more processors, causes the one or more processors to perform the method recited in claim 5.

37. A computer-readable storage medium carrying one or more sequences of instructions which, when executed by one or more processors, causes the one or more processors to perform the method recited in claim 6.

38. A computer-readable storage medium carrying one or more sequences of instructions which, when executed by one or more processors, causes the one or more processors to perform the method recited in claim 7.

39. A computer-readable storage medium carrying one or more sequences of instructions which, when executed by one or more processors, causes the one or more processors to perform the method recited in claim 8.

40. A computer-readable storage medium carrying one or more sequences of instructions which, when executed by one or more processors, causes the one or more processors to perform the method recited in claim 9.

41. A computer-readable storage medium carrying one or more sequences of instructions which, when executed by one or more processors, causes the one or more processors to perform the method recited in claim 10.

42. A computer-readable storage medium carrying one or more sequences of instructions which, when executed by one or more processors, causes the one or more processors to perform the method recited in claim 11.

43. A computer-readable storage medium carrying one or more sequences of instructions which, when executed by one or more processors, causes the one or more processors to perform the method recited in claim 12.

44. A computer-readable storage medium carrying one or more sequences of instructions which, when executed by one or more processors, causes the one or more processors to perform the method recited in claim 13.

45. A computer-readable storage medium carrying one or more sequences of instructions which, when executed by one or more processors, causes the one or more processors to perform the method recited in claim 14.

46. A computer-readable storage medium carrying one or more sequences of instructions which, when executed by one or more processors, causes the one or more processors to perform the method recited in claim 15.

47. A computer-readable storage medium carrying one or more sequences of instructions which, when executed by one or more processors, causes the one or more processors to perform the method recited in claim 16.

48. A computer-readable storage medium carrying one or more sequences of instructions which, when executed by one or more processors, causes the one or more processors to perform the method recited in claim 17.

49. A computer-readable storage medium carrying one or more sequences of instructions which, when executed by one or more processors, causes the one or more processors to perform the method recited in claim 18.

50. A computer-readable storage medium carrying one or more sequences of instructions which, when executed by one or more processors, causes the one or more processors to perform the method recited in claim 19.

51. A computer-readable storage medium carrying one or more sequences of instructions which, when executed by one or more processors, causes the one or more processors to perform the method recited in claim 20.

52. A computer-readable storage medium carrying one or more sequences of instructions which, when executed by one or more processors, causes the one or more processors to perform the method recited in claim 21.

53. A computer-readable storage medium carrying one or more sequences of instructions which, when executed by one or more processors, causes the one or more processors to perform the method recited in claim 22.

54. A computer-readable storage medium carrying one or more sequences of instructions which, when executed by one or more processors, causes the one or more processors to perform the method recited in claim 23.

55. A computer-readable storage medium carrying one or more sequences of instructions which, when executed by one or more processors, causes the one or more processors to perform the method recited in claim 24.

56. A computer-readable storage medium carrying one or more sequences of instructions which, when executed by one or more processors, causes the one or more processors to perform the method recited in claim 25.

57. A computer-readable storage medium carrying one or more sequences of instructions which, when executed by one or more processors, causes the one or more processors to perform the method recited in claim 26.

58. A computer-readable storage medium carrying one or more sequences of instructions which, when executed by one or more processors, causes the one or more processors to perform the method recited in claim 27.

59. A computer-readable storage medium carrying one or more sequences of instructions which, when executed by one or more processors, causes the one or more processors to perform the method recited in claim 28.

60. A computer-readable storage medium carrying one or more sequences of instructions which, when executed by one or more processors, causes the one or more processors to perform the method recited in claim 29.

61. A computer-readable storage medium carrying one or more sequences of instructions which, when executed by one or more processors, causes the one or more processors to perform the method recited in claim 30.

62. A computer-readable storage medium carrying one or more sequences of instructions which, when executed by one or more processors, causes the one or more processors to perform the method recited in claim 31.

63. A method for use in a multi-node shared-nothing database system, the method comprising the steps of:
 a first node of said multi-node shared-nothing database system initially functioning as exclusive owner of a first data item and a second data item, wherein said first data item and said second data item are persistently stored data items within a database managed by the multi-node shared-nothing database system;

without changing the location of a first data item on persistent storage or shutting down said first node, reassigning ownership of the first data item from the first node to a second node of said multi-node shared-nothing database system; and after reassigning ownership, the first node continuing to operate as the owner of the second data item, and to handle all requests for operations on said second data item.

64. A computer-readable storage medium carrying one or more sequences of instructions which, when executed by one or more processors, causes the one or more processors to perform the method recited in claim 63.

65. The method of claim 12, further comprising:

reassigning ownership of data items from the first node to one or more other nodes in response to detecting requests for operations that involve said data items.

66. A computer-readable storage medium carrying one or more sequences of instructions which, when executed by one or more processors, causes the one or more processors to perform the method recited in claim 65.

* * * * *